United States Patent
Jan et al.

(10) Patent No.: US 9,703,009 B2
(45) Date of Patent: Jul. 11, 2017

(54) MATERIAL FOR CONTACT LENSES, CONTACT LENSES AND METHOD OF FORMING THE SAME

(71) Applicant: BenQ Materials Corporation, Taoyuan (TW)

(72) Inventors: Fan-Dan Jan, Taoyuan (TW); Pei-Yi Liu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 5 days.

(21) Appl. No.: 14/931,865

(22) Filed: Nov. 4, 2015

(65) Prior Publication Data
US 2016/0370503 A1    Dec. 22, 2016

(30) Foreign Application Priority Data
Jun. 18, 2015  (TW) .............................. 104119822 A

(51) Int. Cl.
| | | |
|---|---|---|
| C08F 2/46 | (2006.01) |
| C08G 61/04 | (2006.01) |
| G02B 1/04 | (2006.01) |
| B29D 11/00 | (2006.01) |
| B29K 83/00 | (2006.01) |
| B29K 105/00 | (2006.01) |
| C08G 77/38 | (2006.01) |

(52) U.S. Cl.
CPC ........ *G02B 1/043* (2013.01); *B29D 11/00038* (2013.01); *B29K 2083/00* (2013.01); *B29K 2105/0002* (2013.01); *B29K 2105/0005* (2013.01); *B29K 2995/0092* (2013.01); *C08G 77/38* (2013.01)

(58) Field of Classification Search
None
See application file for complete search history.

(56) References Cited

U.S. PATENT DOCUMENTS

| | | | | |
|---|---|---|---|---|
| 2013/0056889 A1* | 3/2013 | Jan ........................ | G02B 1/043 | 264/1.1 |
| 2013/0202551 A1* | 8/2013 | Satake .................. | C07C 219/08 | 424/78.36 |
| 2014/0024738 A1* | 1/2014 | Chen ...................... | G02B 1/043 | 523/107 |

FOREIGN PATENT DOCUMENTS

| | | |
|---|---|---|
| EP | 2765165 A1 | 8/2014 |
| TW | 201312201 A | 3/2013 |
| TW | 201420678 A | 6/2014 |
| WO | 2006026474 A2 | 3/2006 |
| WO | 2011-158321 * | 12/2011 |
| WO | 2012-118686 * | 9/2012 |

OTHER PUBLICATIONS

Hideki Sugimoto et al., "Preparation of high oxygen permeable transparent hybrid copolymers with silicone macro-monomers", Colloid Polym Sci, pp. 173-181, Nov. 3, 2011.

* cited by examiner

*Primary Examiner* — Jessica E Whiteley
(74) *Attorney, Agent, or Firm* — CKC & Partners Co., Ltd.

(57) ABSTRACT

The invention provides a material for contact lenses, including a first siloxane macromer shown as formula (I):

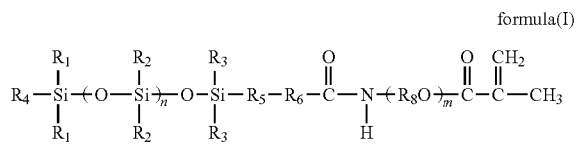

formula(I)

in formula (I), $R_1$, $R_2$ and $R_3$ are $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$ and $R_8$ are $C_1$-$C_4$ alkylene groups and m is an integer of about 1-2, n is an integer of about 4-80; a second siloxane macromer shown as formula (II):

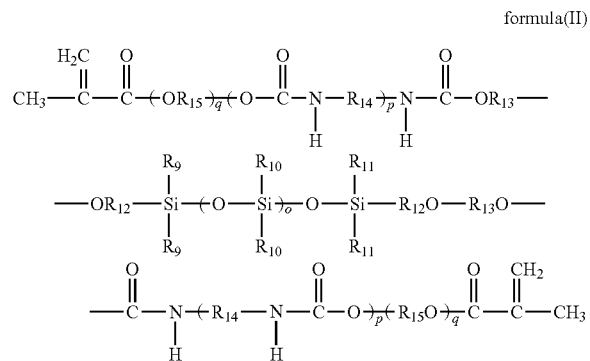

formula(II)

in formula (II), $R_9$, $R_{10}$ and $R_{11}$ are $C_1$-$C_4$ alkyl groups, $R_{12}$, $R_{13}$ and $R_{15}$ are $C_1$-$C_3$ alkylene group, $R_{14}$ is a residue obtained by removing NCO group from an aliphatic or aromatic diisocyanate, and o is an integer of about 4-80, p is an integer of about 0-1; q is an integer of about 1-20; at least one hydrophilic monomer and an initiator.

13 Claims, No Drawings

MATERIAL FOR CONTACT LENSES, CONTACT LENSES AND METHOD OF FORMING THE SAME

CROSS-REFERENCE TO RELATED APPLICATION

This application claims the priority benefit of Taiwanese application serial no. 104119822, filed on Jun. 18, 2015, which is incorporated herein by reference.

BACKGROUND

Technical Field

The present invention relates to a material for manufacturing contact lenses. More particularly, the present invention relates to a hydrophilic material for manufacturing contact lenses having low modulus, excellent water content and high oxygen permeability.

Description of Related Art

In the early years, hard contact lenses were mainly made of glass. The soft contact lenses were therefore developed to improve discomfort of wearing of hard contact lenses. The soft contact lenses can be classified into two categories, hydrogel contact lenses and silicone hydrogel contact lenses.

The hydrogel contact lenses are made from hydrogel materials, such as poly-2-hydroxyethyl methacrylate (p-HEMA). Since the limited material characteristics of hydrogel contact lenses, the oxygen permeability (Dk) thereof is only about 15 to 35.

Comparing to the hydrogel contact lenses, the silicone hydrogel contact lenses have higher oxygen permeability because they are made from siloxane macromer and hydrophilic monomers. Although the siloxane macromer structure is able to provide high oxygen permeability, the higher modulus thereof are therefore occurred at the same time, so as to induce contact lens-induced conjunctival straining (C.L.I.C.S) of wearers easily. Moreover, if the wearers wear the contact lenses in a wrong way, the sickness of eyes may occur more easily. Therefore, a novel material for manufacturing contact lenses is highly demanded to solve the aforementioned problems.

SUMMARY

According to aforementioned reasons, it is an object of the present invention to provide a novel material for manufacturing contact lenses having a lower modulus, excellent water content and high oxygen permeability so that the contact lens-induced conjunctival straining (C.L.I.C.S) of wearers are not induced easily and increasing wearer comfort is obtained.

According to an aspect of the present invention, a composition for manufacturing contact lenses is provided.

The composition for manufacturing contact lenses includes a first siloxane macromer with the number average molecular weight of 500 to 10,000, represented by the following formula (I),

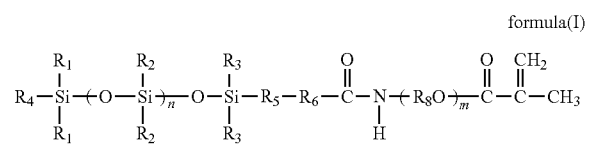

wherein in formula (I), $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_4$ alkylene groups, m is an integer of 1 to 2 and n is an integer of 4 to 80; a second siloxane macromer with the number average molecular weight of 1,000 to 10,000, represented by the following formula (II),

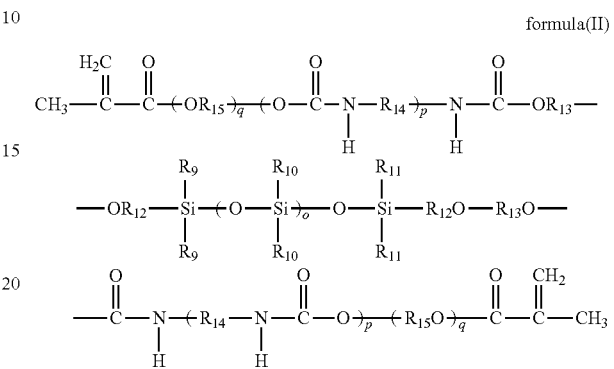

wherein in formula an, $R_9$, $R_{10}$ and $R_{11}$ are independently $C_1$-$C_4$ alkyl groups, $R_{12}$, $R_{13}$, $R_{15}$, are independently $C_1$-$C_3$ alkylene groups, $R_{14}$ is a residue obtained by removing NCO group from an aliphatic or aromatic diisocyanate, o is an integer of 4 to 80, p is an integer of 0 to 1 and q is an integer of 1 to 20; at least one hydrophilic monomer; and an initiator.

According to another aspect of the present invention, a method for manufacturing the contact lenses is provided.

The method for manufacturing contact lenses includes the following steps. First, a first siloxane macromer, a second siloxane macromer, at least one hydrophilic monomer, an initiator and a solvent are mixed to form a mixture. Then the mixture is injected into a mold of contact lens and conducted by a thermal treatment or a UV irradiating treatment to form contact lenses. Wherein the number average molecular weight of the first siloxane macromer represented by the following formula (I) is 500 to 10,000 and the number average molecular weight of the second siloxane macromer of the following formula (II) is 1,000 to 10,000;

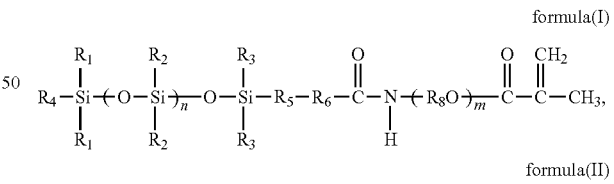

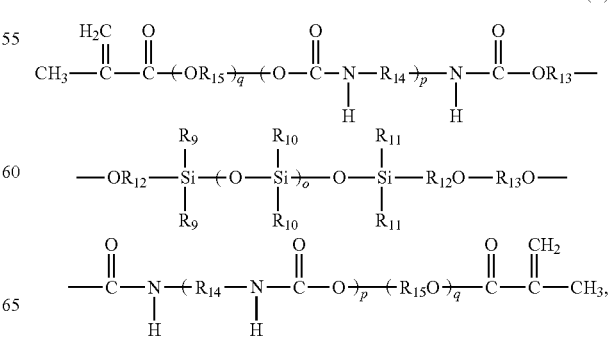

In formula (I), $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_4$ alkylene groups, m is an integer of 1 to 2 and n is an integer of 4 to 80.

In formula (II), $R_9$, $R_{10}$ and $R_{11}$ are independently $C_1$-$C_4$ alkyl groups, $R_{12}$, $R_{13}$, $R_{15}$, are independently $C_1$-$C_3$ alkylene groups, $R_{14}$ is a residue obtained by removing NCO group from an aliphatic or aromatic diisocyanate, o is an integer of 4 to 80, p is an integer of 0 to 1 and q is an integer of 1 to 20.

According to a further another aspect of the present invention, a contact lens obtained by the method mentioned above is provided.

The above and other aspects of the invention will become better understood with regard to the following detailed description of the preferred but non-limiting embodiment(s).

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The present invention provides a composition for manufacturing contact lenses having a lower modulus, excellent water content and high oxygen permeability.

According to an aspect of the present invention, the composition for manufacturing contact lenses includes a first siloxane macromer with the number average molecular weight of 500 to 10,000, represented by the following formula (I):

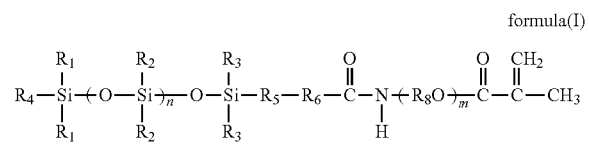

formula(I)

wherein in formula (I), $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$, $R_8$ are independently $C_1$-$C_4$ alkylene groups, m is an integer of 1 to 2 and n is an integer of 4 to 80; a second siloxane macromer with the number average molecular weight of 1,000 to 10,000, represented by the following formula (II):

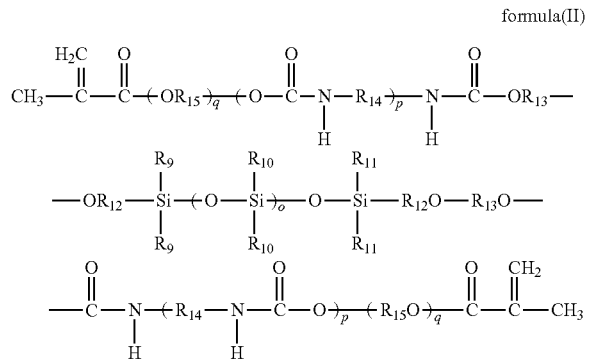

formula(II)

wherein in formula (II), $R_9$, $R_{10}$ and $R_{11}$ are independently $C_1$-$C_4$ alkyl groups, $R_{12}$, $R_{13}$, $R_{15}$, are independently $C_1$-$C_3$ alkylene groups, $R_{14}$ is a residue obtained by removing NCO group from an aliphatic or aromatic diisocyanate, o is an integer of 4 to 80, p is an integer of 0 to 1 and q is an integer of 1 to 20; at least one hydrophilic monomer and an initiator.

In an embodiment of the present invention, the hydrophilic monomers for the composition for manufacturing the contact lenses can be, but not limited to, N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino) ethyl methacrylate (DMAEMA), vinyl acetate, 2-(Dimethylamino)ethyl methacrylate, N-acrylolmorpholine (ACMO) and a combination thereof.

In an embodiment, the initiator suitably used in conventional for manufacturing contact lenses can be a thermal initiator or a photo initiator. The suitable thermal initiator includes but not limited to azobisisoheptonitrile, 2,2'-azobis (isobutyronitrile) (AIBN), 2,2'-azobis(2,4-dimethylvaleronitrile), 2,2'-azobis(2-methyl-propanenitrile), 2,2'-azobis(2-methyl-butanenitrile). The suitable photoinitiator, can be not limited to, such as, for example, 2-Hydroxy-2-methylpropiophenone, 1-Hydroxycyclohexyl phenyl ketone, 2,2-Dimethoxy-2-phenylacetophenone, Benzoin methyl ether, 2,2'-azobis-isobutyronitrile or 2,2-Diethoxyacetophenone.

In an embodiment of the present invention, the first siloxane macromer represented by the above formula (I) is present at an amount of 30 to 55 parts by weight, the second siloxane macromer represented by the above formula (II) is present at an amount of 5 to 30 parts by weight, the hydrophilic polymer is present at an amount of 25 to 60 parts by weight, and the initiator is present at an amount of 0.1 to 1.0 parts by weight.

Moreover, although the second siloxane macromer represented by the above formula (II) has a cross-linking function, it is able to be added in the material for forming contact lenses of present invention together with a cross-linking agent at the same time.

In an embodiment of the present invention, the composition for manufacturing contact lenses further includes a cross-linking agent. The first siloxane macromer represented by the above formula (I) is present at an amount of 20 to 45 parts by weight, the second siloxane macromer represented by the above formula (II) is present at an amount of 3 to 30 parts by weight, the hydrophilic polymer is present at an amount of 30 to 55 parts by weight, the initiator is present at an amount of 0.1 to 1.0 parts by weight, and the cross-linking agent is present at an amount of 0.1 to 5.0 parts by weight.

Further, the cross-linking agent is such as, for example ethylene glycol dimethacrylate (EGDMA), tetraethylene ethylene glycol dimethacrylate (TrEGDMA), triethylene ethylene glycol dimethacrylate (TEGDMA), poly(ethylene glycol) dimethacrylate, trimethylolpropane trimethacrylate (TMPTA), vinyl methacrylate, ethylenediamine dimethyl acrylamide, glycerol dimethacrylate, triallyl isocyanurate or triallyl cyanurate or the combination thereof.

In an embodiment of the present invention, the first siloxane macromer represented by the above formula (I), includes a siloxane macromer represented by the following formula (I-1) or a siloxane macromer represented by the following formula (I-2):

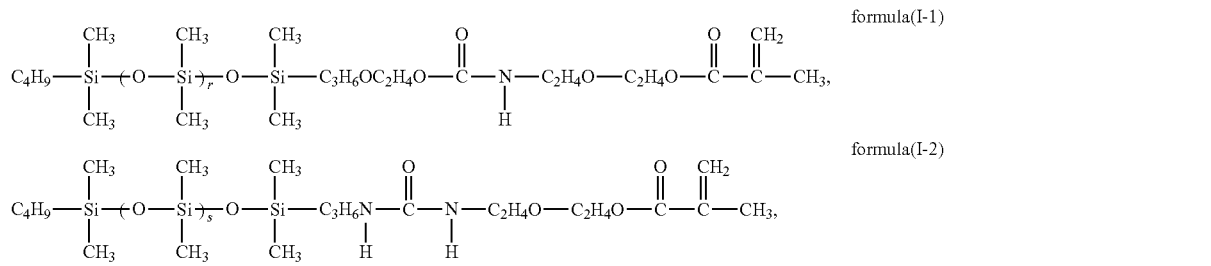

wherein in formula (I-1), r is an integer of 4 to 80, and in formula (I-2), s is an integer of 4 to 80.

In an embodiment of the present invention, the second siloxane macromer includes a siloxane macromer represented by the following formula (II-1) or a siloxane macromer represented by the following formula (II-2).

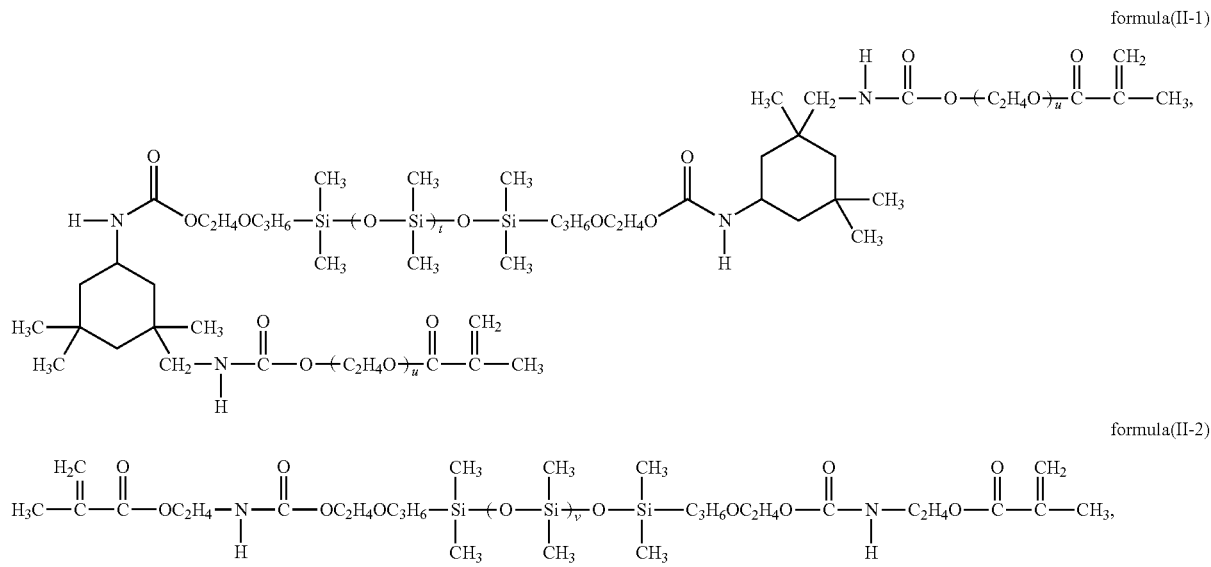

wherein in formula (II-1), t is an integer of 4 to 80, u is an integer of 1 to 10 and in formula (II-2), v is an integer of 4 to 80.

In an embodiment of the present invention, the composition for manufacturing contact lenses includes the first siloxane macromer represented by the above formula (I-1), the second siloxane macromer represented by the above formula (II-1), at least one hydrophilic monomer and the initiator. In the embodiment, the hydrophilic monomer is a combination of NVP, HEMA and ACMO or a combination of NVP, HEMA, ACMO and DEAEMA.

In another embodiment of the present invention, the composition for manufacturing contact lenses includes the first siloxane macromer represented by the above formula (I-1), the second siloxane macromer represented by the above formula (II-1), at least one hydrophilic monomer, the initiator and a cross-linking agent. In the embodiment, the hydrophilic monomer is a combination of NVP and HEMA or a combination of NVP, HEMA and DEAEMA.

In still another embodiment of the present invention, the composition for manufacturing contact lenses includes the first siloxane macromer represented by the above formula (I-1), the second siloxane macromer represented by the above formula (II-2), at least one hydrophilic monomer and the initiator. In the embodiment, the hydrophilic monomer is a combination of NVP, HEMA and ACMO or a combination of NVP, HEMA, ACMO and DEAEMA.

In further another embodiment of the present invention, the present invention provides a composition for manufacturing contact lenses includes the first siloxane macromer represented by the above formula (I-2), the second siloxane macromer represented by the above formula (II-1), at least one hydrophilic monomer and the initiator. In the embodiment, the hydrophilic monomer is a combination of NVP and HEMA or a combination of NVP, HEMA and DMA.

In further another embodiment of the present invention, the present invention provides a composition for manufacturing contact lenses includes the first siloxane macromer represented by the above formula (I-2), the second siloxane macromer represented by the above formula (II-2), at least one hydrophilic monomer and the initiator. In the embodiment, the hydrophilic monomer is a combination of DMA and HEMA.

In addition, the composition for manufacturing contact lenses can further includes but not limited to a dye and/or a UV-blocking agent.

According to another aspect of the present invention, a method for manufacturing contact lenses is provided. The contact lenses obtained by the method have a lower modulus, excellent water content and high oxygen permeability so that the contact lens-induced conjunctival straining (C.L.I.L.S) of wearers are not induced easily and increasing wearer comfort is obtained.

The present method can includes but not limited to the following steps.

Firstly, a first siloxane macromer represented by the following formula (I), a second siloxane macromer represented by the following formula (II), at least one hydrophilic monomer and an initiator are mixed to form a mixture. The formula (I) and the formula (II) are shown as follows.

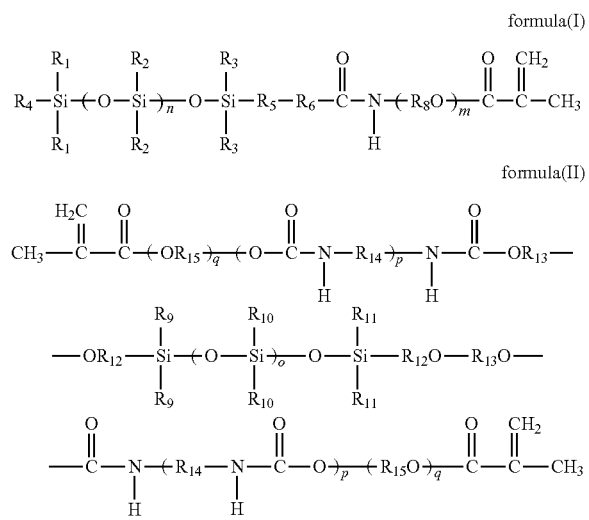

In formula (I), $R_1$, $R_2$ and $R_3$ are independently $C_1$-$C_4$ alkyl groups, $C_4$ is $C_1$-$C_4$ alkyl group, $R_5$ is $C_1$-$C_4$ alkylene group, $R_6$ is —$OR_7O$— or —NH—, $R_7$, $R_8$ are independently $C_1$-$C_4$ alkylene groups, m is an integer of 1 to 2 and n is an integer of 4 to 80. The number average molecular weight of the first siloxane macromer represented by formula (I) is 500 to 10,000.

In formula (II), $R_9$, $R_{10}$ and $R_{11}$ are independently $C_1$-$C_4$ alkyl groups, $R_{12}$, $R_{13}$, $R_{15}$ are independently $C_1$-$C_3$ alkylene groups, $R_{14}$ is a residue obtained by removing NCO functional group from an aliphatic or aromatic diisocyanate, o is an integer of 4 to 80, p is an integer of 0 to 1 and q is an integer of 1 to 20. The number average molecular weight of the first siloxane macromer represented by formula (II) is 1,000 to 10,000.

In an embodiment of the method of the present invention, the hydrophilic monomers include but not limited to N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino)ethyl methacrylate (DMAEMA), vinyl acetate, 2-(Dimethylamino) ethyl methacrylate, N-acrylomorpholine (ACMO) and a combination thereof.

Besides, the initiator suitable used in conventional for manufacturing contact lenses can be used in the composition of the present invention, can be a thermal initiator or a photo initiator. The suitable thermal initiator includes but not limited to azobisisoheptonitrile, 2,2'-azobis(isobutyronitrile) (AIBN), 2,2'-azobis(2,4-dimethylvaleronitrile), 2,2'-azobis (2-methyl-propanenitrile), 2,2'-azobis(2-methyl-butanenitrile). The suitable photo initiator includes but not limited to 2-Hydroxy-2-methylpropiophenone, 1-hydroxycyclohexyl phenyl ketone, 2,2-Dimethoxy-2-phenylacetophenone, Ben-Zoin methyl ether, 2,2'-azobis-isobutyronitrile or 2,2-Dietyoxyacetophenone.

In an embodiment of the method of the present invention, the first siloxane macromer represented by the above formula (I) is present at an amount of 30 to 55 parts by weight, the second siloxane macromer represented by the above formula (II) is present at an amount of 5 to 30 parts by weight, the hydrophilic monomer is present at an amount of 25 to 60 parts by weight, and the initiator is present at an amount of 0.1 to 1.0 parts by weight.

Moreover, in the step of forming mixture in the method for manufacturing contact lenses, the mixture further includes a cross-linking agent.

In an embodiment of the method of the present invention, the first siloxane macromer represented by the above formula (I) is present at an amount of 20 to 45 parts by weight, the second siloxane macromer represented by the above formula (II) is present at an amount of 3 to 30 parts by weight, the hydrophilic monomer is present at an amount of 30 to 55 parts by weight, the initiator is present at an amount of 0.1 to 1.0 parts by weight and the cross-linking agent is present at an amount of 0.1 to 5.0 parts by weight.

Further, the cross-linking agent includes but not limited to ethylene glycol dimethacrylate (EGDMA), tetraethylene ethylene glycol dimethacrylate (TrEGDMA), triethylene ethylene glycol dimethacrylate (TEGDMA), poly(ethylene glycol) dimethacrylate, trimethylopropane trimethacrylate (TMPTA), vinyl methacrylate ethylenediamine dimethyl acrylamide, glycerol dimethacrylate, triallyl isocyanurate or triallyl cyanurate or the combination thereof.

In an embodiment of the method of the present invention, the first siloxane macromer represented by the above formula (I) in the mixture includes a siloxane macromer represented by the following formula (I-1) or a siloxane macromer represented by the following formula (I-2):

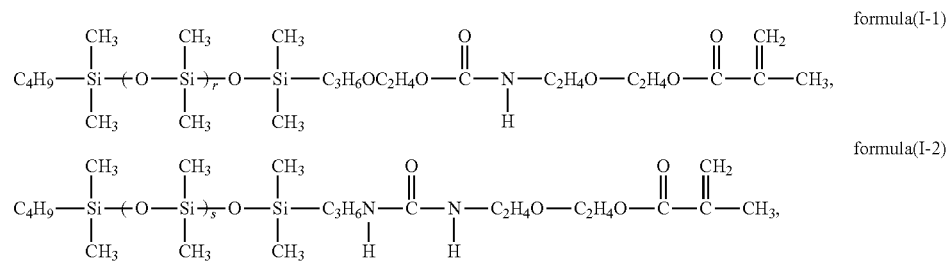

wherein in formula (I-1), r is an integer of 4 to 80, and in formula (I-2), s is an integer of 4 to 80.

In an embodiment of the method of present invention, the second siloxane macromer represented by the above formula (II) in the mixture includes a siloxane macromer represented by the following formula (II-1) or a siloxane macromer represented by the following formula (II-2).

mixing the first siloxane macromer represented by the above formula (I-2), the second siloxane macromer represented by the above formula (II-2), at least one hydrophilic monomer and the initiator. In the embodiment, the hydrophilic monomer is a combination of DMA and HEMA.

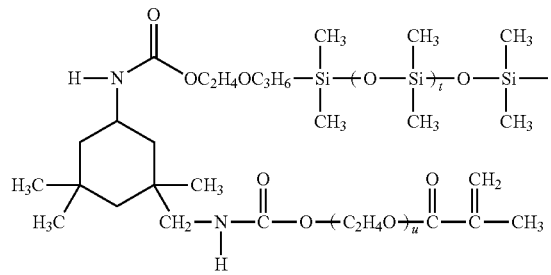

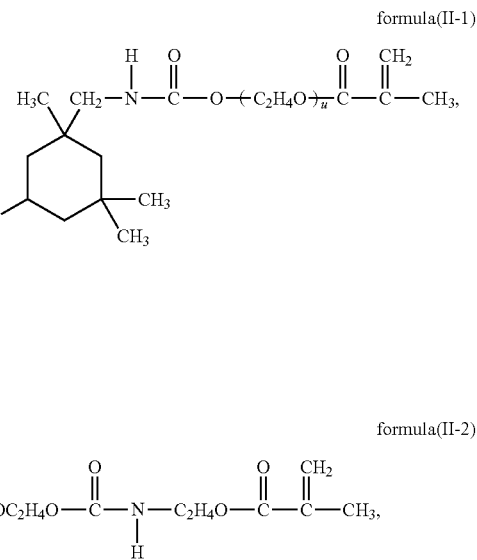

wherein in formula (II-1), t is an integer of 4 to 80, u is an integer of 1 to 10 and in formula (II-2), v is an integer of 4 to 80.

In an embodiment of the method of the present invention, the step of forming the mixture includes mixing the first siloxane macromer represented by the above formula (I-1), the second siloxane macromer represented by the above formula (II-1), at least one hydrophilic monomer and the initiator. In the embodiment, the hydrophilic monomer is a combination of NVP, HEMA and ACMO or a combination of NVP, HEMA, ACMO and DEAEMA.

In another embodiment of the method of the present invention, the step of forming the mixture includes mixing the first siloxane macromer represented by the above formula (I-1), the second siloxane macromer represented by the above formula (II-1), at least one hydrophilic monomer, the initiator and a cross-linking agent. In the embodiment, the hydrophilic monomer is a combination of NVP and HEMA or a combination of NVP, HEMA and DEAEMA.

In still another embodiment of the method of the present invention, the step of forming the mixture includes mixing the first siloxane macromer represented by the above formula (I-1), the second siloxane macromer represented by the above formula (II-2), at least one hydrophilic monomer and the initiator. In the embodiment, the hydrophilic monomer is a combination of NVP, HEMA and ACMO or a combination of NVP, HEMA, ACMO and DEAEMA.

In further embodiment of the method of the present invention, the step of forming the mixture includes mixing the first siloxane macromer represented by the above formula (I-2), the second siloxane macromer represented by the above formula (II-1), at least one hydrophilic monomer and the initiator. In the embodiment, the hydrophilic monomer is a combination of NVP and HEMA or a combination of NVP, HEMA and DMA.

In further another embodiment of the method of the present invention, the step of forming the mixture includes In addition, the mixture could further includes but not limited to a dye and/or a UV-blocking agent or other materials suitable used in the prior contact lenses for providing specific functions.

In the method of the present invention, after forming the mixture, the mixture is injected into a mold of contact lens and conducted a UV irradiation treatment or a thermal treatment to form contact lenses.

In an embodiment of the method of the present invention, the thermal treatment is conducted at temperature in a range between about 30° C. to 150° C., and the reaction time is in a range between about 1 hour to 12 hours. In another embodiment of the method of the present invention, the thermal treatment is conducted at temperature in a range between 30° C. to 70° C. for 0 hr to 2 hours, subsequently at temperature in a range between 70° C. to 100° C. for 2 hours to 4 hours and then at temperature in a range between 100° C. to 150° C. for 4 hours to 12 hours.

After forming contact lenses, the method of the present invention can further includes a hydration treatment. In an embodiment of the method of the present invention, the hydration treatment includes but not limited to the following steps.

Firstly, the contact lenses are soaked in alcohol solution, then soaked in water, and finally soaked in a buffer solution to reach equilibria.

According to a further another aspect of the present invention, a contact lens obtained by the method mentioned above is provided.

Additionally, the tensile modulus of the contact lenses according to the present invention is about 0.42 MPa to 0.7 Mpa. The water content of the contact lenses is about 30% to 56%. Besides, the oxygen permeability of the contact lenses is more than 80, and preferably more than 166.

The present invention will be explained in further detail with reference to the examples. However, the present invention is not limited to these examples.

1. Preparation of Siloxane Macromers

Example A. Preparation of the First Siloxane Macromer (I-1)

(I) The reaction scheme of the first siloxane macromer (I-1) is shown as follow:

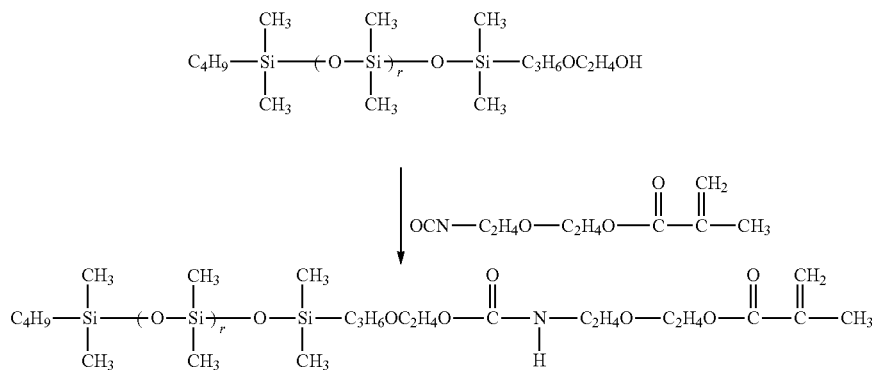

(II) Preparation of the first siloxane macromer (I-1)

20 g of monocarbinol terminated polydimethylsiloxane (Mw. is 1000, commercial code is MCR-C12, and is available from Gelest, US), 3.98 g of (2-(2-isocyanatoethyloxy) ethyl methacrylate, (commercial code is Karenz MOI-EG and is available from Showa Denko K.K., Japan), 0.025 g of dibutyltin dilaurate as a catalyst and 40 mL of methylene chloride were added to a flask to form a solution, then the solution was stirred at room temperature. After the solution was stirred at room temperature for 6 hours, the resulting reaction product was washed with a large amount of water, and then dehydrated and filtered to obtain a raw product. Then, the methylene chloride was evaporated to obtain the first siloxane macromer (I-1) (The number average molecular weight is 1200).

(III) The properties of the first siloxane macromer (I-1)

The results of analysis were exhibited as follows:

IR Spectroscopy:

(i) Absorption bands derived from Si—CH$_3$ at 802 cm$^{-1}$ and 1259 cm$^{-1}$.

(ii) An absorption band derived from Si—O—Si at 1032 cm$^{-1}$ and 1100 cm$^{-1}$.

NMR Spectroscopy:

(i) A peak derived from Si—CH$_3$ is at around 0.19 ppm to 0.02 ppm.

(ii) A peak derived from amide group is at 5.56 ppm.

(iii) A peak derived from methyl protons of methacryloyl group is at 1.93 ppm.

(iv) A peak of vinyl protons of methacryloyl group is at 5.56 ppm and 6.11 ppm.

Example B: Preparation of the First Siloxane Macromer (I-2)

(I) The reaction scheme of the first siloxane macromer (I-2) is shown as follow:

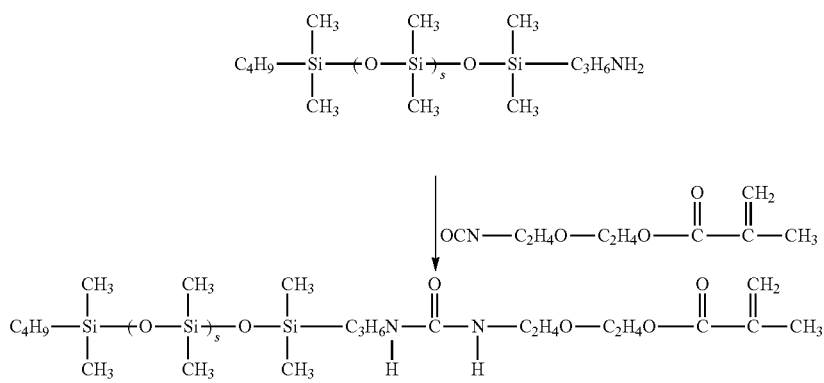

(II) Preparation of the first siloxane macromer (I-2)

20 g of monoaminopropyl terminated polydimethylsiloxane (commercial code is MCR-A11, Mw. is 350, and is available from Gelest, US), 11.37 g of (2-(2-isocyanatoethyloxy) ethyl methacrylate, (commercial code is Karenz MOI-EG and is available from Showa Denko K.K., Japan), 0.025 g of dibutyltin dilaurate as a catalyst and 40 mL of methylene chloride were added to a flask to form a solution, then the solution was stirred at room temperature. After the solution was stirred at room temperature for 4 hours, the resulting reaction product was washed with 20 ml of water, and then dehydrated and filtered to obtain a raw product.

Then, the methylene chloride was evaporated to obtain the first siloxane macromer (I-2) (The number average molecular weight is 549).

(III) The properties of the first siloxane macromer (I-2)
The results of analysis were exhibited as follows:
IR Spectroscopy:
(i) Absorption bands derived from Si—CH$_3$ at 802 cm$^{-1}$ and 1259 cm$^{-1}$.
(ii) An absorption band derived from Si—O—Si at 1032 cm$^{-1}$ and 1100 cm$^{-1}$.
NMR Spectroscopy:
(i) A peak derived from Si—CH$_3$ is at around 0.19 to 0.02 ppm.
(ii) A peak derived from amide group is at 5.56 ppm.
(iii) A peak derived from methyl protons of methacryloyl group is at around 1.92 ppm.
(iv) A peak of vinyl protons of methacryloyl group is at around 5.56 ppm and 6.10 ppm.

Example C: Preparation of the Second Siloxane Macromer (II-1)

(I) The reaction scheme of the second siloxane macromer (II-1) is shown as follow:

(II) Preparation of the second siloxane macromer (II-1)
8.88 g of isophorone diisocyanate, 0.0025 g of dibutyltin dilaurate as the catalyst, and 40 mL of methylene chloride were added to a flask to form a solution, and the solution was stirred under a stream of nitrogen. Then, 20 g of (α,ω-bis (2-hydroxyethoxypropyl)-polydimethylsiloxane (The number average molecular weight is 3000, commercial code is KF-6002, and is available from Shin Etsu Chemical Co., Ltd.) was accurately weighed and added dropwise to the solution over about 1 hour. After the solution reacting at room temperature for 12 hours, another 0.0025 g of dibutyltin dilaurate and 14.4 g of polyethylene glycol monomethacrylate (The number average molecular weight is 360) were accurately weighed and added dropwise to the solution over about 1 hour. After the solution reacting at room temperature for another 12 hours, the resulting reaction product was washed with a large amount of water, and then dehydrated and filtered to obtain a raw product. Then, the methylene chloride was evaporated to obtain the second siloxane macromer (II-1) (The number average molecular weight is 4,000).

(III) The properties of the second siloxane macromer (II-1)
The results of analysis were exhibited as follows:
IR Spectroscopy:
(i) Absorption bands derived from Si—CH$_3$ is at 802 cm$^{-1}$ and 1259 cm$^{-1}$.

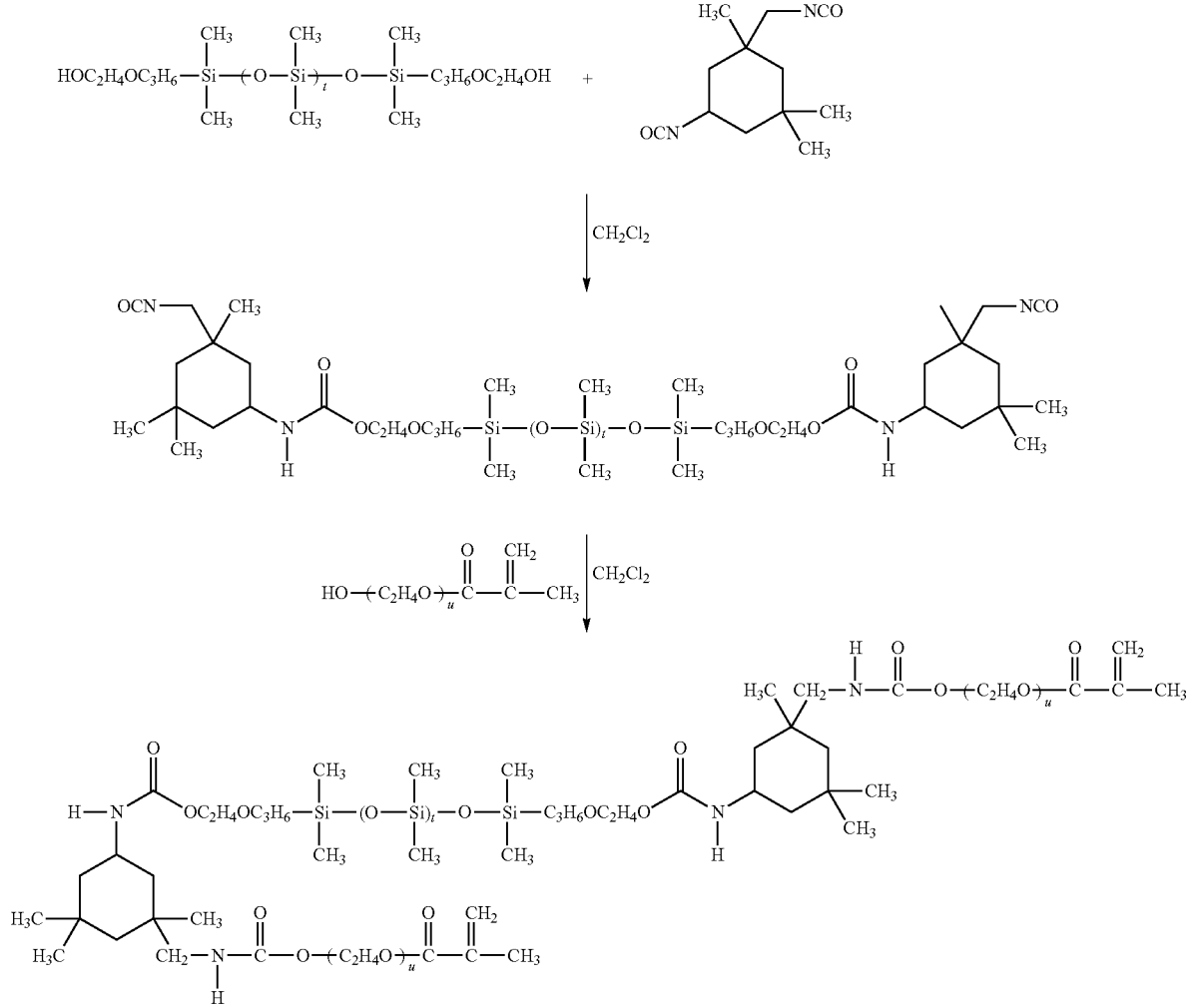

(ii) An absorption band derived from Si—O—Si is at around 1032 cm$^{-1}$ and 1100 cm$^{-1}$.

(iii) An absorption band derived from C=O of methacryloyl group is around at 1720 cm$^{-1}$.

NMR Spectroscopy:

(i) A peak derived from Si—CH$_3$ is at around 0.1 ppm.

(ii) A peak of methyl protons derived from isophorone diisocyanate at around from 0.8 ppm to 1.2 ppm.

(iii) A peak derived from methyl protons of methacryloyl group at around 1.92 ppm.

(iv) A peak of vinyl protons of methacryloyl group at around 5.55 ppm and 6.11 ppm.

Example D: Preparation of the Second Siloxane Macromer (II-2)

(I) The reaction scheme of the second siloxane macromer (II-2) is shown as follow:

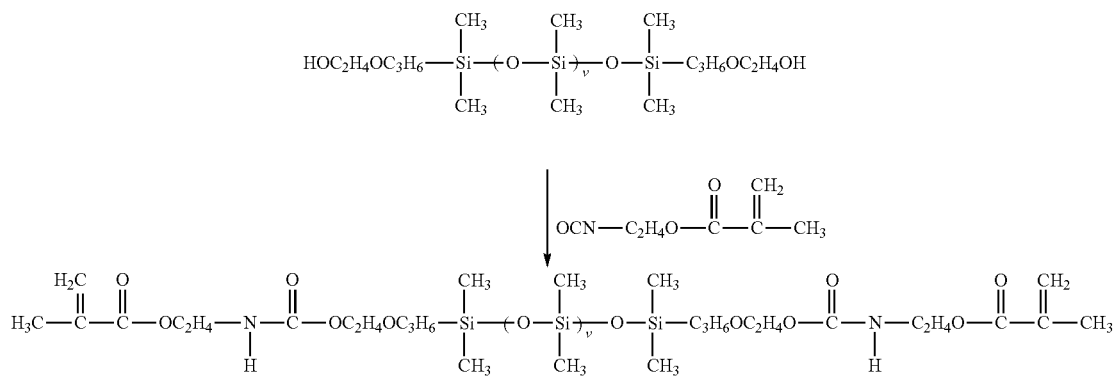

(II) Preparation of the second siloxane macromer (II-2)

20 g of (α,ω-bis(2-hydroxyethoxypropyl)polydimethylsiloxane (The number average molecular weight is 3000, commercial code is KF-6002, and is available from Shin Etsu Chemical Co., Ltd.), 2 g of 2-isocyanatoethyl methacrylate, 0.025 g of dibutyltin dilaurate as a catalyst and 50 mL of methylene chloride were added to a flask to form a solution, then the solution was stirred at room temperature. After the solution is stirred at room temperature for 6 hours, the resulting reaction product was washed with a large amount of water, and then dehydrated and filtered to obtain a raw product. Then, the methylene chloride was evaporated to obtain a siloxane macromer (II-2) (The number average molecular weight is 3,300).

(III) The properties of the second siloxane macromer (II-2)

The results of analysis were exhibited as follows:

IR Spectroscopy:

(i) Absorption bands derived from Si—CH$_3$ at 802 cm$^{-1}$ and 1259 cm$^{-1}$.

(ii) An absorption band derived from Si—O—Si at 1032 cm$^{-1}$ and 1100 cm$^{-1}$.

NMR Spectroscopy:

(i) A peak derived from Si—CH$_3$ is at around 0.19 ppm to 0.02 ppm.

(ii) A peak derived from amide group is at 5.01 ppm.

(iii) A peak derived from methyl protons of methacryloyl group is at around 1.92 ppm.

(iv) A peak of vinyl protons of methacryloyl group is at around 5.567 ppm and 6.09 ppm.

2. Preparation of Contact Lenses (1) The preparations of the contact lenses of Example 1 to Example 11 are described in detail as follows and amounts of every component used in Examples are listed in Table 1. The physical properties of contact lenses are shown in Table 2.

(I) The preparation of the contact lenses of Example 1 to Example 7, and Example 10 to Example 11.

A first siloxane macromer (I-1), a first siloxane macromer (I-2), a second siloxane macromer (II-1), a second siloxane macromer (II-2), a thermal initiator, azobisisoheptonitrile (ADVN), N,N-dimethylacrylamide (DMA), N-vinylpyrrodine (NVP), 2-hydroxyethyl methacrylate (HEMA), ethyl methacrylate (DMAEMA) and N-acrylolmorpholine (ACMO) were mixed at the amounts shown in Table 1 and stirred about 1 hour.

Then, the mixtures were injected into a mold of contact lens made of polypropylene (PP) and heated to initiate the radical polymerization thereof at 60° C. for 10 hours, then 80° C. for 2 hours, and 135° C. for 2 hours.

After the polymerization was completed, the mold was immersed in alcohol solution for 1 hour and the resulting molded lens was taken out of the mold. Then, the resulting lens was conducted a hydration treatment to obtain the contact lens with high oxygen permeability. Finally, a sterilizing treatment was conducted. The steps and the conditions of the hydration treatment and the sterilizing treatment were as follows:

The steps of hydration treatment of the contact lenses (a) The mold was immersed in 80% alcohol solution for 1 hour then the resulting molded lens was taken out of the mold.

(b) The polymer resulting molded lens was then immersed in 90% alcohol solution for 1 hour.

(c) The alcohol-immersed contact lens was immersed in heated water at 80° C. for 1 hour.

(d) The contact lens was immersed in a buffer solution to obtain equilibrium for 12 hours.

The conditions of sterilizing treatment:

The conditions of sterilizing treatment: 121° C. for 30 minutes.

(2) The preparation of the contact lenses of Example 8 and Example 9.

The first siloxane macromer (I-2), the second siloxane macromer (II-1), the second siloxane macromer (II-2), the N,N-dimethylacrylamide (DMA), the N-vinylpyrrodine (NVP), the 2-hydroxyethyl methacrylate (HEMA) were mixed at the amounts shown in Table 1 and stirred about 1 hour. Then, a photoinitiator, 2-Hydroxy-2-methylpropiophenone (trade name is Darocur 1173 and is available from BASF, Germany) was added into the above mixture. After that, the mixtures were injected into a mold of contact lens made of polypropylene (PP) and conducted a UV irradiating treatment with an accumulated energy of 2 to 3 mW/cm² for 1 hour.

After the polymerization was completed, the mold was immersed in isopropyl alcohol solution for 1 hour and the resulting molded lens was taken out of the mold. Then, the resulting lens was conducted a hydration treatment to obtain the contact lens with high oxygen permeability. Finally, a sterilizing treatment was conducted. The steps and the conditions of the hydration treatment and he sterilizing treatment were as the same as mentioned above.

(3) The physical properties of the contact lenses prepared from Example 1 to Example 11, Comparative Example 1 (O₂OPTIX, commercially available from Ciba) and Comparative Example 2 (PureVision, commercially available from B&L) were measured according to the following measuring method. The resulting data were listed in the Table 2.

(a) Measurement of the Water Content of Contact Lenses

The contact lens was immersed in the phosphate buffered saline (PBS) for 24 hours at 23° C. Then, the contact lens was removed therefrom and was taken to remove all surface water. After that, the weight of contact lens was measured. Next, the contact lens was hydrated at 600 W for 5 minutes by microwave and after that the weight of hydrated contact lens was measured. The water contact of contact lenses was calculated by the following equation: (the weight of hydrated contact lenses−the weight of dry contact lenses)/the weight of hydrated contact lenses×100%.

(b) Measurement of Tensile Modulus and Tensile Strength of Contact Lenses

The test sample was cut from the middle area of a contact lens into a sample size of 10 mm. Then, the test sample was immersed in a buffer specified in ISO 18369-3 Section 4.7 for 2 hours. After that, the test sample was taken to remove all surface water and be conducted to measure tensile modulus and tensile strength by using an AI-3000 (available from Gotech Testing Maching Inc.) in a condition of temperature between 20±5° C. and a humidity between 55%±10%. The measurement was carried out at a constant loading speed of 10 mm/min. In final, the tensile modulus and tensile strength were determined according to the initial gradient of the strain-stress curve. The unit of the tensile modulus is defined as MPa and the unit of tensile strength is defined as gram.

(c) Measurement of Oxygen Permeability of Contact Lenses

The oxygen permeability (Dk) was measured according to ISO standards 18369-4:2006, 4.4.3, by using a oxygen permeability tester (201T). The units of oxygen permeability (Dk) is defined as $10^{-10}$ (mlO₂ mm)/(cm² sec mm Hg).

As shown in Table 2, the contact lenses according to the present invention have lower modulus than Comparative Examples. In the Example 1 to Example 11, the tensile modulus thereof are all lower than 0.7 MPa and in Example 1 is even lower than 0.42 MPa. But the modulus of Comparative Example 1 and Comparative Example 2 are higher than 0.9 MPa.

Moreover, the water content of Example 1 to Example 11 are higher than 30%, and the water content of Example 1 and Example 5 are even higher than 50%. In addition, the oxygen permeability of Example 1 to Example 11 are more than 80, especially in Example 6 and Example 7, the oxygen permeability thereof are more than 150, but the oxygen permeability of Comparative Example 1 and Comparative Example 2 are only 75 and 84, respectively.

As a result, the novel contact lens material for manufacturing contact lenses according to the present invention could provide characteristics of lower modulus, excellent water content and high oxygen permeability.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

TABLE 1

The detailed composition of contact lenses of Examaple 1 to Example 11

| Composition | Function | Example (wt %) | | | | | | | | | | |
|---|---|---|---|---|---|---|---|---|---|---|---|---|
| | | 1 | 2 | 3 | 4 | 5 | 6 | 7 | 8 | 9 | 10 | 11 |
| First siloxane macromer (I-1) | Siloxane macromer | 36.35 | 38.61 | 20.5 | 35.46 | 38.4 | 44.41 | 50.19 | | | | 39.37 |
| First siloxane macromer (I-2) | | | | | | | | | 34.1 | 27.7 | 34.5 | |
| Second siloxane macromer (II-1) | | | 3.75 | 5.62 | 18.8 | 11.43 | | | | 7.3 | 25 | 6.2 |
| Second siloxane macromer (II-2) | | | | | | 7.3 | 5.79 | 5.79 | 14.1 | | | |
| DMA | Hydrophilic monomer | | 11.45 | | | | | | 15.4 | 10.5 | | |
| DEAEMA | | 18.61 | | | | | 3.1 | | | | | |
| NVP | | 18.62 | 17.21 | 26.3 | 20.5 | 24.4 | 32.61 | 27.82 | | 17.6 | 20 | 36.4 |
| HEMA | | 11.42 | 12.28 | 6.2 | 9.46 | 4.8 | 11.41 | 13.52 | 15.9 | 16.4 | 10 | 14.48 |
| ACMO | | | 4.25 | | 2.45 | 4.5 | 2.1 | 2.1 | | | | 0.31 |
| ADNV | Initiator | 0.58 | 0.58 | 0.7 | 0.7 | 0.6 | 0.58 | 0.58 | | | 0.5 | 0.52 |
| Darocur 1173 | | | | | | | | | 0.5 | 0.5 | | |
| EGDMA | Cross linking agent | 0.67 | | 2.5 | | | | | | | | |
| Hexanol | Solvent | | | 25 | 20 | | | | | | | |
| Ethanol | | | 10 | 10 | 20 | | | | 20 | 20 | 10 | 2 |

TABLE 2

The measurement results of Example 1 to Example 11 and Comparative Example 1 and Comparative Example 2

| Test item | Example | | | | | | | | | | | Comparative Example | |
|---|---|---|---|---|---|---|---|---|---|---|---|---|---|
| | 1 | 2 | 3 | 4 | 5 | 6 | 7 | 8 | 9 | 10 | 11 | 1 | 2 |
| Water content (%) | 55.27 | 46.72 | 34.9 | 30.5 | 51.5 | 43.32 | 41.58 | 38.8 | 34.9 | 30.1 | 43.8 | 36 | 33 |
| Tensile modulus (MPa) | 0.42 | 0.5 | 0.49 | 0.55 | 0.58 | 0.65 | 0.64 | 0.53 | 0.62 | 0.68 | 0.7 | 1 | 0.93 |
| Tensile Strength (g) | 68.5 | 43.6 | 15 | 16.6 | 37 | 60 | 83 | 49 | 23 | 227 | 53.83 | 103 | 60 |
| Oxygen permeability (Dk) | 125 | 116.9 | 81 | 94 | 101 | 158 | 166 | 93 | 85 | 128 | 120.2 | 75 | 84 |

What is claimed is:

1. A composition for manufacturing contact lenses comprising:

a first siloxane macromer with the number average molecular weight in a range of 500 to 10,000, represented by the following formula (I)

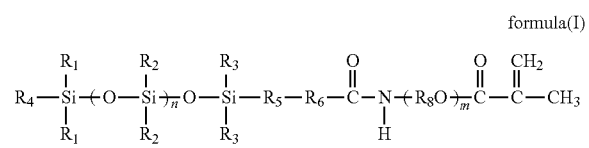

formula(I)

wherein in formula (I), $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$ and $R_8$ are independently $C_1$-$C_4$ alkylene groups, m is an integer of 1 to 2 and n is an integer of 4 to 80;

a second siloxane macromer, with the number average molecular weight in a range of 1,000 to 10,000, represented by the following formula (II)

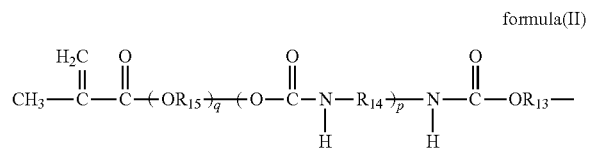

formula(II)

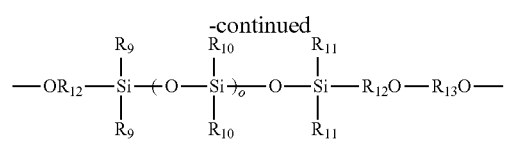

-continued

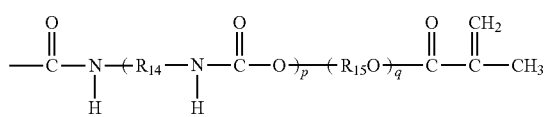

wherein in formula (II), $R_9$, $R_{10}$ and $R_{11}$ are independently $C_1$-$C_4$ alkyl groups, $R_{12}$, $R_{13}$, $R_{15}$, are independently $C_1$-$C_3$ alkylene groups, $R_{14}$ is a residue obtained by removing NCO group from an aliphatic or aromatic diisocyanate, o is an integer of 4 to 80, p is an integer of 0 to 1 and q is an integer of 1 to 20;

at least one hydrophilic monomer; and an initiator.

2. The composition for manufacturing contact lenses according to claim 1, wherein the first siloxane macromer comprises a siloxane macromer represented by the following formula (I-1) or a siloxane macromer represented by the following formula (I-2):

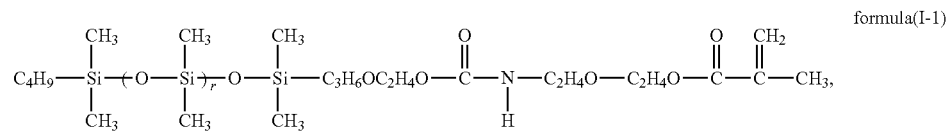

formula(I-1)

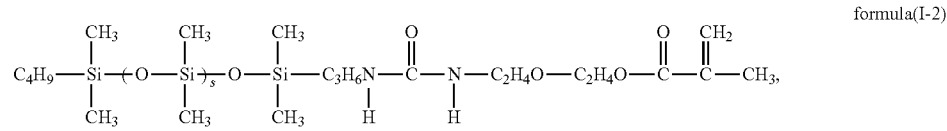

formula(I-2)

wherein in formula (I-1), r is an integer of 4 to 80, and in formula (I-2), s is an integer of 4 to 80.

3. The composition for manufacturing contact lenses according to claim 1, wherein the second siloxane macromer comprises a siloxane macromer represented by the following formula (II-1) or a siloxane macromer represented by the following formula (II-2):

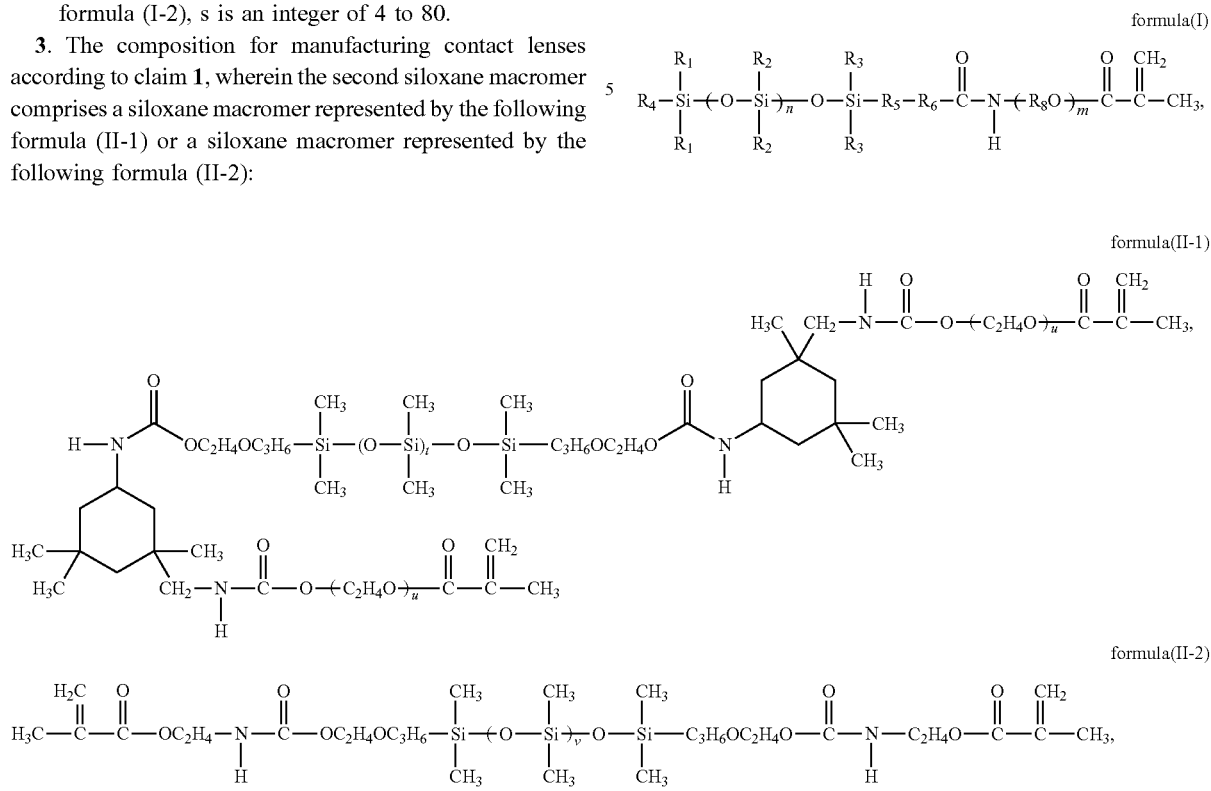

wherein in formula (II-1), t is an integer of 4 to 80, u is an integer of 1 to 10 and in formula (II-2), v is an integer of 4 to 80.

4. The composition for manufacturing contact lenses according to claim 1, wherein the initiator is a thermal initiator or a photo initiator.

5. The composition for manufacturing contact lenses according to claim 1, wherein the composition further includes a crosslinking agent selected from a group consisting of ethylene glycol dimethacrylate (EGDMA), triethylene ethylene glycol dimethacrylate (TEGDMA), tetraethylene ethylene glycol dimethacrylate (TrEGDMA), poly(ethylene glycol) dimethacrylate, trimethylolpropane trimethacrylate (TMPTA), vinyl methacrylate, ethylenediamine dimethyl acrylamide, glycerol dimethacrylate, triallyl isocyanurate and triallyl cyanurate.

6. The composition for manufacturing contact lenses according to claim 1, further comprising a dye and/or an UV-blocking reagent.

7. A method fix manufacturing contact lenses comprising:
(a) mixing a first siloxane macromer represented by the following formula (I), a second siloxane macromer represented by the following formula (II), at least one hydrophilic monomer, an initiator and a solvent to form a mixture; and
(b) injecting the mixture into a mold of contact lens and conducting a thermal treatment or a UV irradiating treatment to the mixture to form contact lenses;
wherein the number average molecular weight of the first siloxane macromer of formula (I) is 500 to 10,000 and the number average molecular weight of the second siloxane macromer of formula (II) is 1,000 to 10,000;

-continued

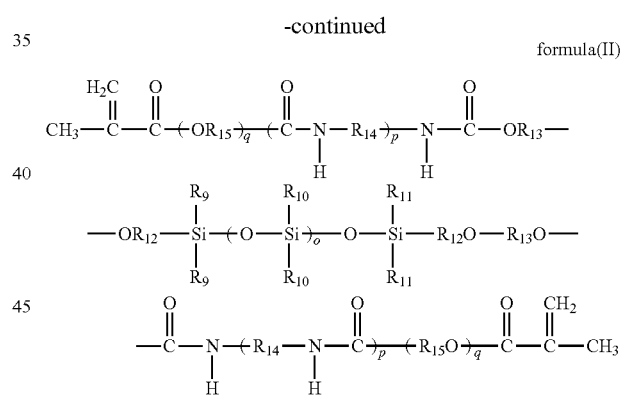

wherein in formula (I), $R_1$, $R_2$ and $R_3$ are independently $C_1$-$C_4$ alkyl groups, $R_4$ is $C_1$-$C_6$ alkyl group, $R_5$ is $C_1$-$C_4$ alkylene group, $R_6$ is —$OR_7O$— or —NH—, $R_7$ and $R_8$ are independently $C_1$-$C_4$ alkylene groups, m is an integer of 1 to 2 and n is an integer of 4 to 80;

wherein in formula (II), $R_9$, $R_{10}$ and $R_{11}$ are independently $C_1$-$C_4$ alkyl groups, $R_{12}$, $R_{13}$, $R_{15}$, are independently $C_1$-$C_3$ alkylene groups, $R_{14}$ is a residue obtained by removing NCO group from an aliphatic or aromatic diisocyanate, o is an integer of 4 to 80, p is an integer of 0 to 1 and q is an integer of 1 to 20.

8. The method for manufacturing contact lenses according to claim 7, wherein the first siloxane macromer comprises a siloxane macromer represented by the following formula (I-1) or a siloxane macromer represented by the following formula (I-2):

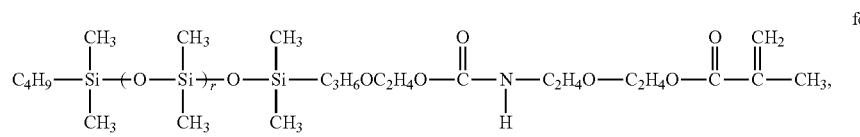

formula(I-1)

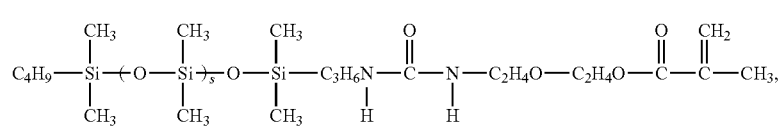

formula(I-2)

wherein in formula (I-1), r is an integer of 4 to 80, and in formula (I-2), s is an integer of 4 to 80.

9. The method for manufacturing contact lenses according to claim 7, wherein the second siloxane macromer comprises a siloxane macromer represented by the following formula (II-1) or a siloxane macromer represented by the following formula (II-2):

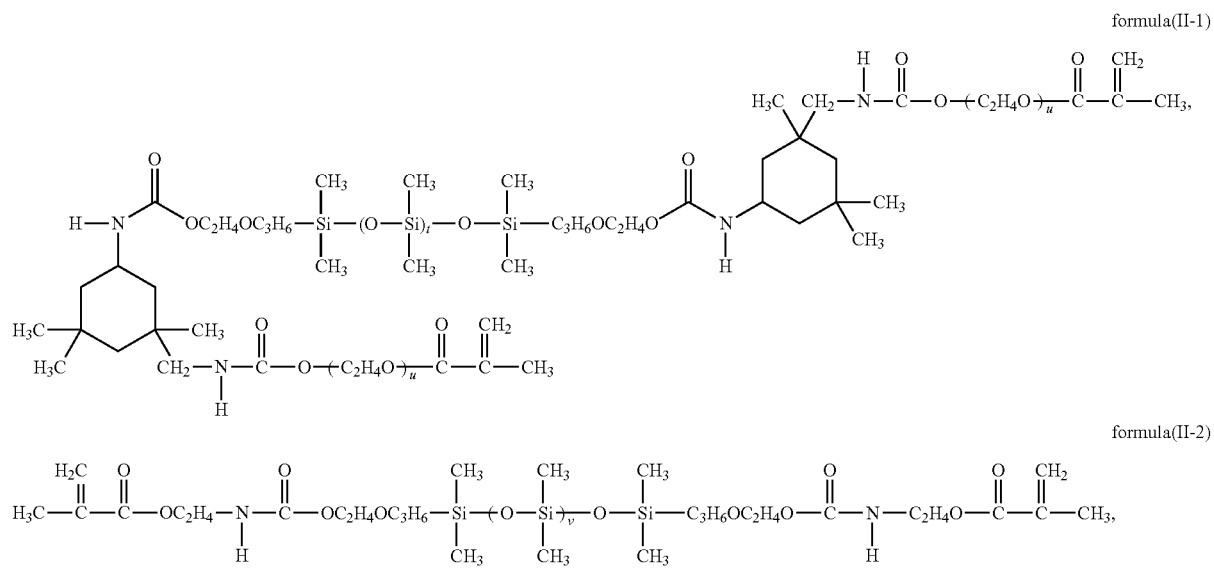

wherein in formula (II-1), t is an integer of 4 to 80, u is an integer of 1 to 10 and in formula (II-2), v is an integer of 4 to 80.

10. The method for manufacturing contact lenses according to claim 7, wherein the initiator is a thermal initiator or a photo initiator.

11. The method for manufacturing contact lenses according to claim 7, wherein the mixture further comprises a crosslinking agent selected from a group consisting of ethylene glycol dimethacrylate (EGDMA), triethylene ethylene glycol dimethacrylate (TEGDMA), tetraethylene ethylene glycol dimethacrylate (TrEGDMA), poly(ethylene glycol) dimethacrylate, trimethylolpropane trimethacrylate (TMPTA), vinyl methacrylate, ethylenediamine dimethyl acrylamide, glycerol dimethacrylate, triallyl isocyanurate and triallyl cyanurate.

12. The method for manufacturing contact lenses according to claim 7, wherein the mixture further comprises a dye and/or an UV-blocking reagent.

13. The contact lens which is obtained by the method for manufacturing lenses according to claim 7.

* * * * *